United States Patent
Levin et al.

(10) Patent No.: US 10,255,151 B1
(45) Date of Patent: Apr. 9, 2019

(54) SECURITY TESTING USING A COMPUTER ADD-IN CARD

(71) Applicant: Amazon Technologies, Inc., Seattle, WA (US)

(72) Inventors: Alex Levin, Cupertino, CA (US); Christopher James BeSerra, Federal Way, WA (US); Ron Diamant, Albany, CA (US)

(73) Assignee: Amazon Technologies, Inc., Seattle, WA (US)

(*) Notice: Subject to any disclaimer, the term of this patent is extended or adjusted under 35 U.S.C. 154(b) by 178 days.

(21) Appl. No.: 15/384,031

(22) Filed: Dec. 19, 2016

(51) Int. Cl.
*G06F 11/22* (2006.01)
*G06F 11/30* (2006.01)

(52) U.S. Cl.
CPC ...... *G06F 11/2221* (2013.01); *G06F 11/3031* (2013.01)

(58) Field of Classification Search
CPC .... G06F 11/22–11/221; G06F 11/2221; G06F 11/2268; G06F 11/2289; G06F 11/261; G06F 11/3031
USPC ............................................. 714/41, 43, 44
See application file for complete search history.

(56) References Cited

U.S. PATENT DOCUMENTS

| | | | | |
|---|---|---|---|---|
| 6,182,248 B1* | 1/2001 | Armstrong | ............ | G06F 11/221 714/43 |
| 6,745,345 B2* | 6/2004 | Cabezas | ................ | G06F 11/221 714/33 |
| 7,131,031 B2* | 10/2006 | Brundridge | ............... | H04L 1/24 714/25 |
| 7,174,480 B1* | 2/2007 | Denning | ............... | G06F 11/261 714/28 |
| 8,176,207 B2* | 5/2012 | Solomon | ............... | G06F 11/221 710/10 |

\* cited by examiner

*Primary Examiner* — Joseph R Kudirka
(74) *Attorney, Agent, or Firm* — Klarquist Sparkman, LLP

(57) ABSTRACT

A smart add-in card can be leveraged to perform testing on a host server computer. The add-in card can include an embedded processor and memory. Tests can be downloaded to the add-in card to test a protocol under which the add-in card operates. In a particular example, a PCIe communication bus couples the motherboard to the add-in card and the tests can purposely violate the PCIe specification. The tests can be developed to test conditions that are typically difficult to test without the use of special hardware. However, the smart add-in card can be a simple Network Interface Card (NIC) that resides on the host server computer during normal operation and is used for communication other than security testing. By using the NIC as a testing device, repeatable and reliable testing can be obtained.

20 Claims, 9 Drawing Sheets

SECURITY TESTING USING A COMPUTER ADD-IN CARD

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing can include a plurality of server computers interconnected within a data center. The server computers typically include expansion boards (also called expansion cards) which can be inserted into expansion slots on the server computers to add functionality to the computer system. A server computer communicates with the expansion cards through an expansion bus which electrically connects the internal hardware of the computer with peripheral devices. One type of expansion card includes a network interface card (NIC) which typically provides the server computer with a dedicated, full-time connection to a network.

One type of expansion bus is a Peripheral Component Interconnect Express (PCIe) bus which is a high-speed serial computer expansion bus standard. Other bus types can also be used in place of the PCIe bus, such as the ASUS media bus, the multi-bus, SBUS, etc. Expansion cards that include a CPU and/or DRAM are considered to be "smart" cards. The smart expansion cards can be programmed to run various software applications that enables the card to provide increased flexibility over typical hardware-only interface cards.

The expansion cards can have various types of error reporting. For example, PCIe uses the advanced error reporting (AER) to report errors to the host server computer. Example errors can include a link error, a parity error, etc. Testing of errors can be problematic and there are a variety of errors that rarely occur, which are even more difficult to detect.

The expansion cards can also represent a vulnerability for attacks from malicious software. For example, malicious software can inject errors into the server bus in order to create problems on the host server computer. Thus, it is desirable to perform testing on any expansion card to prevent attacks on the server computer via malicious software injected through the expansion card. Additionally, updates of the server computer, such as updates of the operating system or BIOS, can expose the host server computer to new malicious attacks via the expansion card.

DETAILED DESCRIPTION

Figure 1:
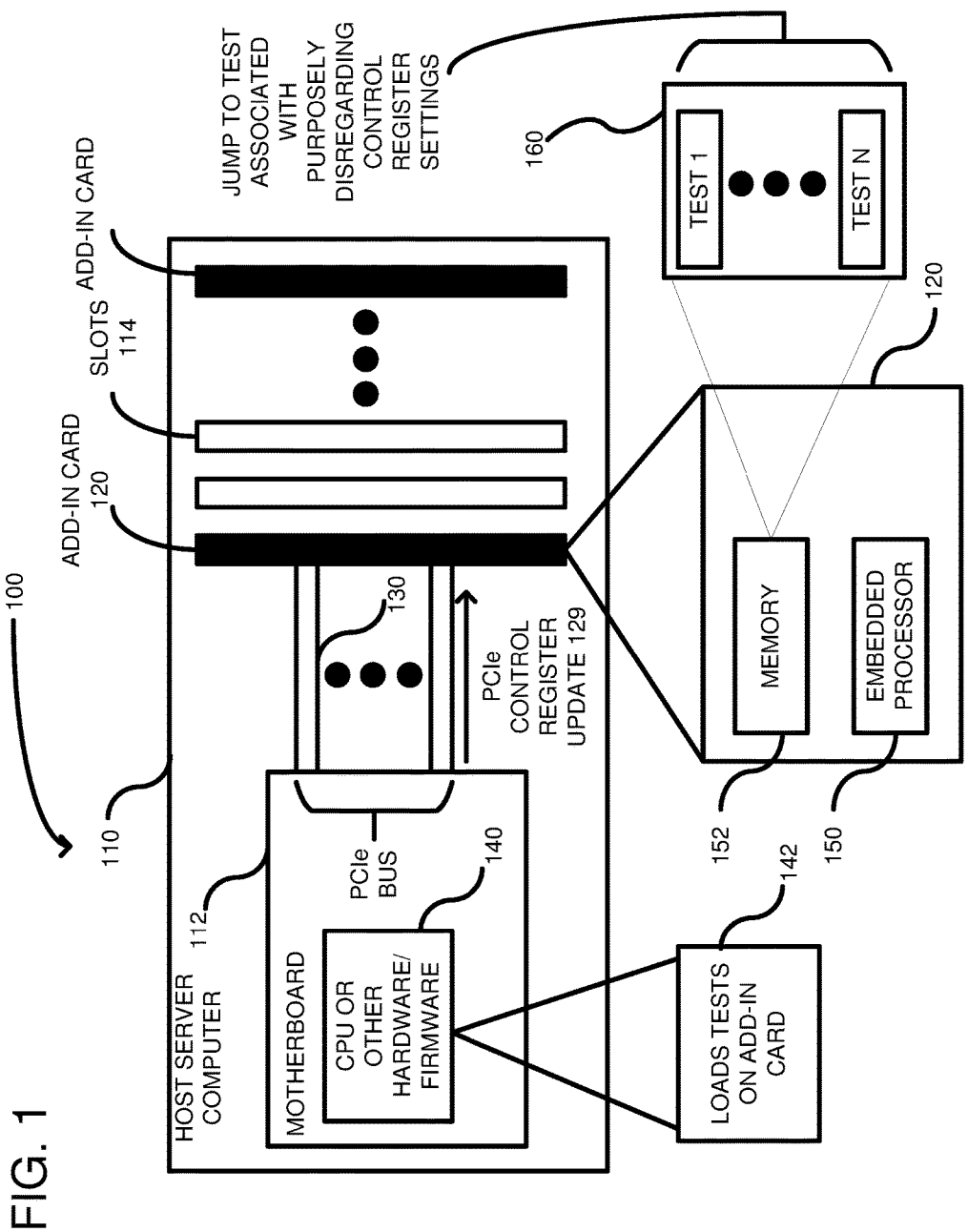
FIG. 1 is an example system diagram showing a host server computer including one or more add-in cards for injecting errors on a communication bus.

A "smart add-in card" (for example, a smart Network Interface Card (NIC)) is an add-in card that has an embedded CPU and memory (e.g., DRAM), and can be programmed to execute various software applications. Host tools can allow control of the smart add-in card from the host server computer. For example, in the case where a communication bus is PCIe, the host server computer can act as the PCIe Root Complex. The host tools can be used to communicate with the smart add-in card over PCIe using the Base Address Registers (BARs) to transfer data so as to make the smart card perform various operations. Using these host tools, binaries can be sent to the smart card to execute specific software testing operations. For example, the binaries can be such that the smart add-in card is used as a testing device for deliberately triggering hard-to-reach security testing. Such security testing can be triggered in a controlled environment to make sure the PCIe root port (named "the host server computer" or root complex), deals with the security violations in a desired manner. For example, a customer instance running on a server computer should not be affected by such security breaches in any way. The technology described herein provides the ability to check how the host server computer handles multiple security violation events so that it has the ability to protect itself from a physical access of an attacker over a PCIe communication bus and from any failure that could harm the server or its associated software. As discussed herein, the host server computer refers to a motherboard operating as the main computational engine of the computer. Add-in cards, while being physically in the same chassis as the motherboard, can in at least some cases be thought of as an independent logical computer.

An inexpensive solution is provided wherein a smart add-in card is used to simulate unexpected events for testing a server for security holes and/or dangerous software vulnerabilities. The smart-card can be used during testing to deliberately violate a communication protocol used for communication between the add-in card and the host server computer. For example, the communication protocol can be a PCIe bus protocol and the protocol can be purposely violated. A check can then be performed to verify that the system does not crash or behave incorrectly. Some example violations that an add-in card could trigger include the following:

1. The PCIe specification defines a Bus Master Enable control register (also called a configuration register), which is used to instruct a device not to initiate any transaction. An add-in card that violates this configuration register could cause a system crash, or security issues, in the host server computer. Thus, the add-in card can purposely ignore this configuration register setting as a test to see how the host server computer responds.

2. The PCI specification defines a power state. A host server computer can instruct a device to enter power-down mode, and the add-in card can purposely ignore this command.

3. The PCI specification defines BARs (Base Address Registers), which control the memory mapped address space that is allocated to each device. A device can ignore this configuration, and respond to address spaces that are not assigned to it.

These are just examples of how the PCI specification can be purposely violated. Other examples are too numerous to list and are available in the PCIe specification. However, just to list a few, the control registers used in violations can include one or more of the following: a PCIe Capabilities Register, a Device Capabilities Register, a Device Control Register, a Device Status Register, a Link Capabilities Register, a Link Control Register, a Link Status Register, a Slot Capabilities Register, a Slot Control Register, a Slot Status Register, a Root Control Register, a Root Capabilities Register, or a Root Status Register.

The PCI Express Capabilities Register indicates the device and port type, the slot implemented, an interrupt message number, etc. The Device Capabilities Register indicates a maximum payload size supported, phantom functions supported, extended tag field supported, acceptable latency, a slot power limit value, and a function level reset capability. The Device Control Register defines whether correctable error reporting is enabled, non-fatal error reporting is enabled, fatal error reporting is enabled, unsupported request reporting is enabled, relaxed ordering is enabled, max payload size is defined, etc. The Device Status Register indicates whether correctable errors are detected, whether non-fatal errors are detected, whether unsupported requests are detected, whether transactions are pending, etc. The Link Capabilities Register indicates the maximum link speed, the maximum link width, the active state power management support, the exit latency, the clock power management, the port number etc. The Link Control Register includes active state power management control, one or more bits associated with root ports, one or more bits associated with disabling a link, clock configuration, clock power management, etc. The Link status register includes bits associated with link speed, link width, link training, slot clock configuration, etc. The Slot Capabilities Register indicates whether an attention button is present, a power controller is present, an attention indicator is present, a power indicator is present, whether hot-plug surprise is enabled, slot power limit value, slot power limit scale, and a physical slot number. The Slot Control Register indicates whether the attention button pressed is enabled, whether the power fault detected is enabled, whether hot-plug interrupt is enabled, etc. The Slot Status Register indicates whether a power fault was detected, whether an MRL Sensor was changed, whether a presence detected changed, whether a data link layer state changed, etc. The Root Control Register include whether a system error is correctable, whether a PME interrupt is enabled, etc. The Root Capabilities Register is associated with a CRS software visibility. A Root Status Register is associated with a PME requester ID, PME status, etc. These are just examples of control registers, configurations and functionalities that can be used. Others can also be added.

FIG. 1 shows a system 100 including a host server computer 110. The host server computer includes a motherboard 112 and multiple slots 114 for receiving one or more add-in cards 120. The motherboard 112 is coupled to the add-in cards 120 via a communication bus 130, such as PCIe bus or other type of communication bus. The motherboard 112 includes a CPU 140 or other hardware/firmware for executing commands (e.g., in software) to the add-in cards 120 via the communication bus 130. Example commands include commands to load and execute tests on the add-in card, such as is shown at 142. The add-in card 120 is considered a "smart card" due to an embedded processor 150 and a memory 152. The memory 152 can be used for storing a plurality of tests 160, such as test 1 through test N. Such tests can be used for purposely violating control registers associated with the communication bus 130, such as the PCIe control registers identified above. The tests can further be used to purposely violate any aspects of the PCIe specification by ignoring settings, configurations, or rules expected to be followed by the add-in card in order to comply with the host server environment. The tests 160 can be triggered from the commands 142 or the tests can be triggered upon receiving a change to the control registers. For example, an agent executing on the add-in card 120 can monitor the control registers and when a control register is updated (see update 129), the agent can initiate a test 160 associated with that control register. The tests specifically generate operations that violate the settings of the control register. The operations can include reads and writes to memory locations in contradiction to settings in the control register, disregard power related limitations, intentionally misrepresent accurate control register settings, etc. In this way, the motherboard 112 can execute one or more tests on the add-in cards so as to test the communication bus 130 on the host server computer 110, the communications protocol, or other rules that the add-in card is expected to follow in order to comply with to operate within the host server environment.

When using the PCIe protocol, the host server computer operates as a PCIe root complex and the add-in card acts as a PCIe endpoint. If other protocols are used, then the host server computer and add-in card assume the corresponding roles under that protocol.

In sum, an add-in card used in normal operation of the host server computer can be leveraged for in-depth PCIe communication bus testing. The add-in card can be a NIC for allowing communication between the host server computer 110 and other network devices. The embedded processor on the add-in card can read a control register associated with the PCIe specification, and generate operations that violate the settings of the control register. The operations can include reading and writing operations to any data location or control register location. Other add-in cards can be used, but such add-in cards should include an embedded processor or other hardware that can execute a software agent, and memory. Example add-in cards include the following: cryptographic smart cards, SATA smart cards, etc.

Figure 2:
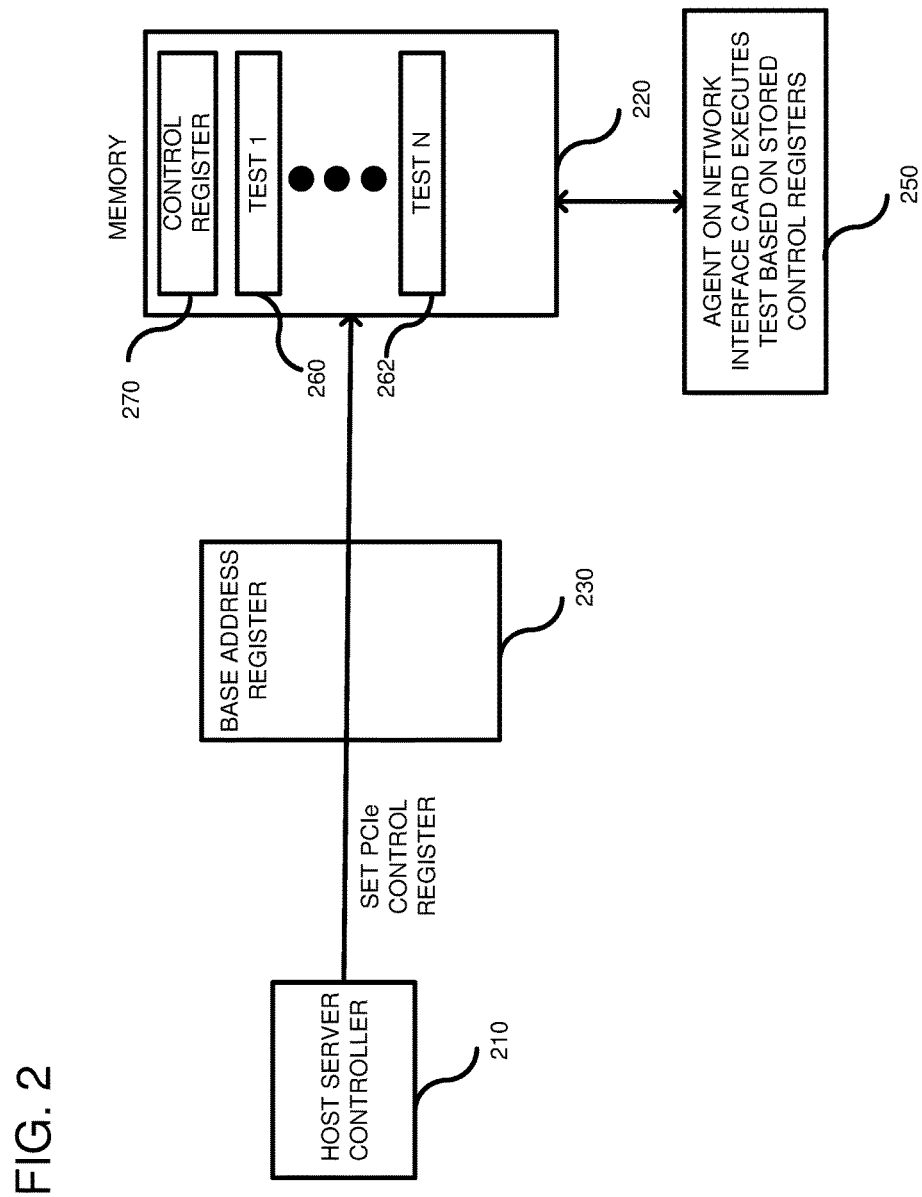
FIG. 2 shows the host server computer communicating with the add-in card through a Base Address Register (BAR).

FIG. 2 is an example configuration wherein a host server controller 210 communicates with a memory 220 of an add-in card through a Base Address Register 230 (BAR). The host server controller 210 can be a processor or other firmware on a motherboard of a host server computer. The BAR 230 can be used to map addresses from the host server controller 210 to the memory 220 on the add-in card through an address translation. The add-in card can include a software agent 250, which executes on a processor (not shown) located on the add-in card. The host server controller 210 can load a plurality of tests 1-N, such as is shown at 260, 262 (where N is any number). One or more memory locations, such as a memory location 270 (used as a control register), can be used to indicate to the agent 250 whether or not to begin performance of the tests. Thus, the agent 250 can loop on the control register 270 until the control register is changed or otherwise updated. Once the control register is updated, the agent can jump to the appropriate test associated with that control register. The agent can then load and execute the appropriate test in order to test PCIe functionality. For example, the agent 250 can perform a variety of operations that directly contradict the control register settings so as to determine how the host server computer responds to the illegal operations. Although a memory structure is shown having a control register 270 acting as a trigger flag, other configurations can be used. For example, a dedicated trigger flag can be used that indicates which control register has been updated. The agent 250 can then jump to test code to execute the code associated with that control register. The agent 250 includes the capability to control the communication bus between the add-in card and the host server computer such that it can create transactions according to the protocol associated with the communication bus. The agent also has the ability to manipulate the add-in card by changing port information, memory information, control information, data information, etc. Through such operations, the agent 250 can test how the host server computer responds to attacks on the host server computer using an improper agent injected onto an add-in card that is used to violate add-in card settings.

Figure 3:
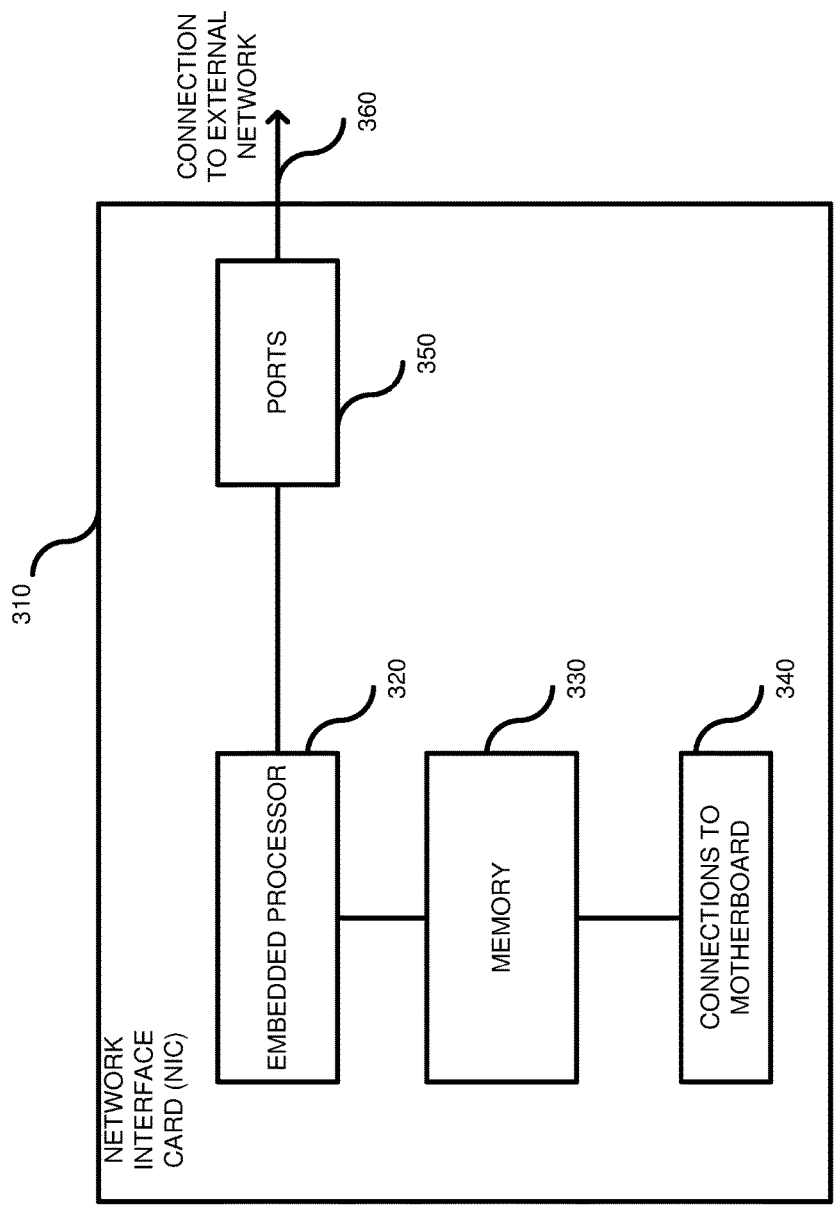
FIG. 3 shows an example add-in card, which in this case is a NIC.

FIG. 3 is an example of a NIC 310 that includes an embedded processor 320, a memory 330, connections to the motherboard 340, and I/O ports 350 for connecting to an external network 360. The embedded processor 320 can be a micro-controller, a processor or other hardware/firmware used for implementing processor—like functionality. The memory 330 can be a DRAM or other types of memory capable of having the tests stored and readable by the embedded processor 320. The connections to the motherboard 340 can be through a standard slot-type receptacle that are readily available in server computers. Example bus connections include, but are not limited to, PCIe, traditional PCI, Accelerated Graphics Port (AGP), Industry Standard Architecture (ISA), Micro Channel Architecture (MCA), etc. The ports 350 can include any variety of network connections such as Ethernet, LAN, etc. The NIC can serve dual functionality: in normal-operating mode, it can allow the host server computer to communicate over an external network; and in a test mode, it can use its processor and memory to receive and execute tests from the host server computer to test the protocol being used over the connections 340 to the motherboard. In a specific example, a control register can be set that limits the behavior of the add-in card. For example, the control register can limit how much power can be used, what memory locations can be accessed, clock control, etc. In a particular example, a power budget is set through control registers, and the power budget dictates how much power is available to the add-in card. The testing code can then control the behavior of the add-in card such that it exceeds the available power budget. The tests can purposely contravene the control register settings so as to test the host server computer. Although a NIC is shown, other add-in cards can be used having similar hardware components, as shown in FIG. 3.

Figure 4:
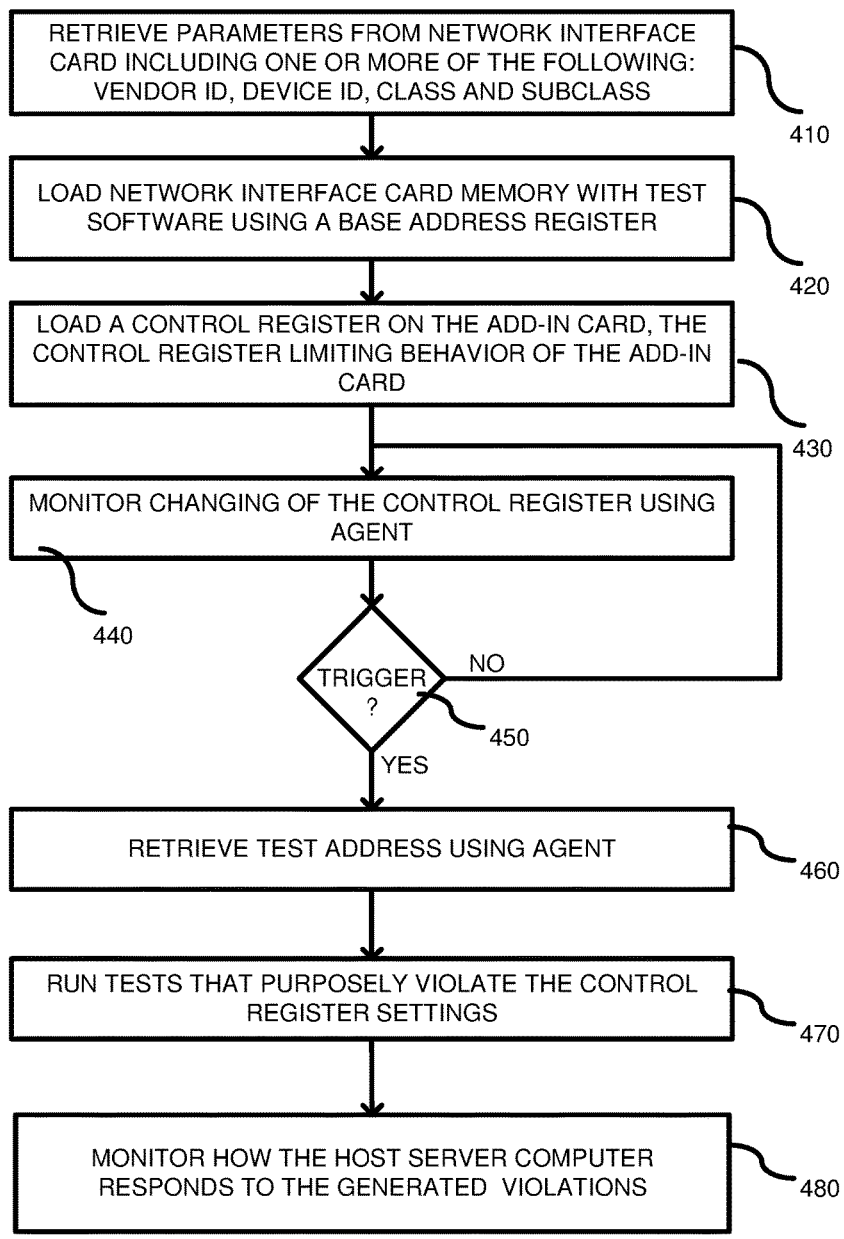
FIG. 4 is a flowchart according to one embodiment for loading tests into the add-in card and for purposely violating control register settings associated with a communication bus.

FIG. 4 is a flowchart according to one embodiment for purposely violating a protocol of a communication path. In process block 410, parameters can be retrieved from a NIC including one or more of the following parameters: vendor ID, device ID, class and subclass. Retrieving of these parameters can be through a PCIe request from the host server computer to the NIC. The parameters can be stored on the NIC and can change based on which interface card is installed within a slot on the host server computer. For example, different vendors provide different NICs that require different software drivers for proper functionality. The above-identified parameters can be used by the host server computer to identify the NIC and to determine which device driver to load and test. For example, the host server computer can perform a simple table lookup using the retrieved parameters. Thus, the host server computer can identify the configuration space of the add-in card through communication between the add-in card and the host server computer. In process block 420, the host server computer can load the NIC memory with test software using a Base Address Register (BAR). The test software can be any desired software tests for testing the communication bus or other add-in card constraints between the host server computer's motherboard and the add-in card. The test software can be contingent based on which configuration space was detected. In process block 430, a control register on the add-in card can be loaded, wherein the control register limits behavior of the add-in card. For example, the behavior can be based on latency, link speed, power usage, error reporting, clock configuration, etc. In process block 440, the agent executing on the NIC can read the control register and determine that a test is ready to be executed. For example, if the control register value changed, this can be considered a trigger event upon which testing can commence. The agent can then obtain the base address of the test and jump to that address so as to begin execution of the test. In decision block 450, if the control register was not updated, then the agent loops on monitoring the control register. However, if the control register has been updated, then in process block 460 the agent retrieves the test address from memory and runs the test including purposely violating the control register settings (470). In other embodiments, instead of control register settings, other restrictions on the add-in card functionality can be purposely violated. Finally in process block 480, the host server computer can be monitored to see how it responds to the generated violations created by the tests. Thus, difficult to test communication protocol violations can be effectively tested through the use of tests loaded onto standard hardware within the host server computer. Consequently, special test hardware does not need to be separately installed on the host server computer. Instead, the host server computer can execute tests in a test mode and then switch to a normal operating mode without the need to plug or unplug testing hardware into the host server computer environment. This provides flexibility for testing to occur anytime and controlled from a remote location.

Figure 5:
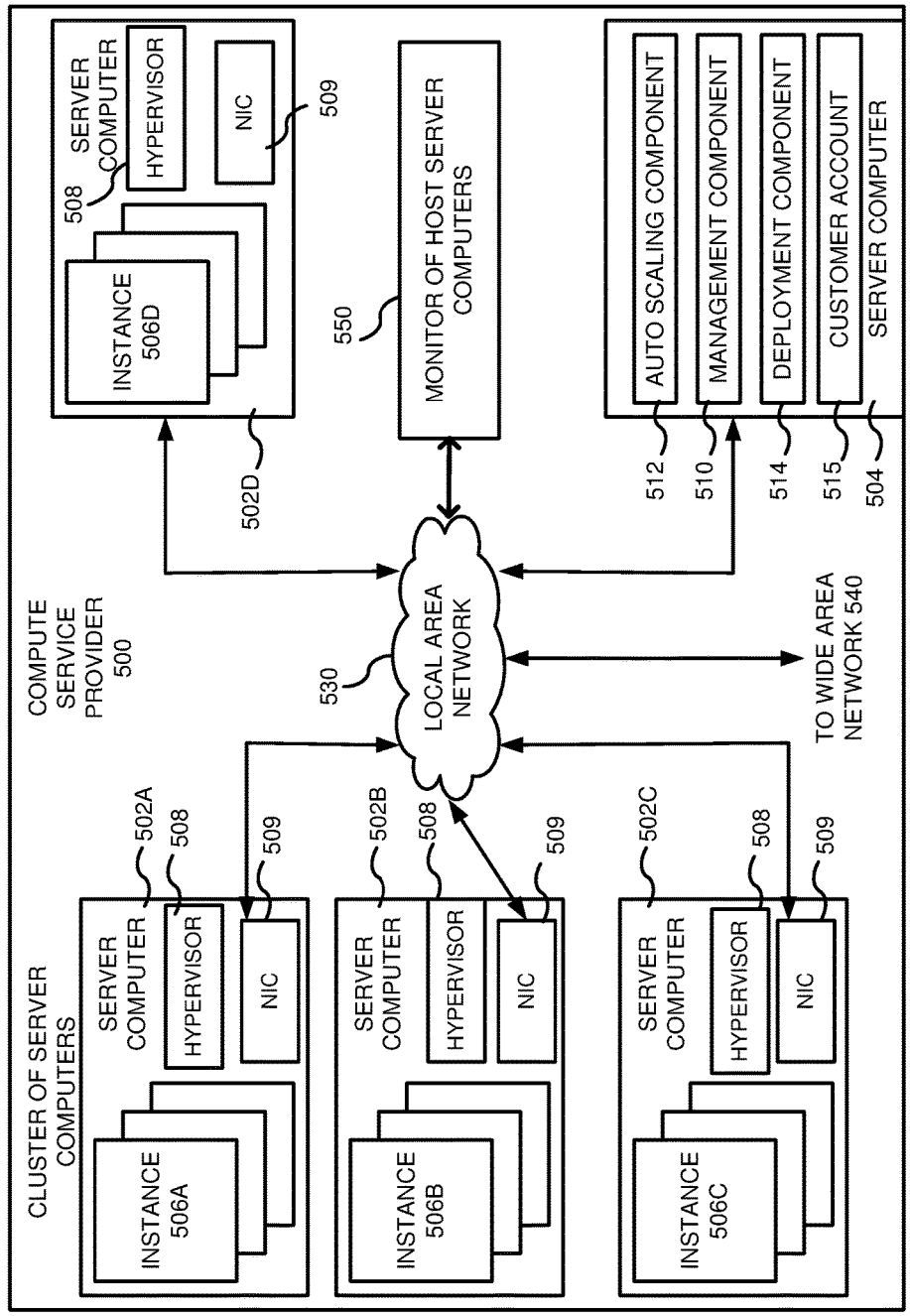
FIG. 5 is an example system diagram showing a plurality of virtual machine instances running in a multi-tenant environment with a host server computer monitoring for violations of control register settings or other communication bus-related violations.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. The hypervisor 508 and/or instances 506 communicate with a network 530 via a NIC 509. The NIC provides for two-way communication between the host servers 502 and the compute service provider 500.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

The network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

Each server computer 502 can be responsible for executing local tests by using the NICs 509. The results of the tests can be monitored by a server computer 550 used to monitor how the host server computers 502 respond to the intentional contravention of communication bus protocol control registers associated with the local bus using the NIC. Such testing can be performed at any desired point of time, but typically is executed after upgrades, such as an upgrade of an operating system or an upgrade of a BIOS. In one example, the control registers are associated with a PCIe bus protocol and are used to control behavior of the NIC. In another example, the testing can be initiated by either the host server computer 502 upon which the NIC resides or an external host server computer 550 to the NIC.

Figure 6:
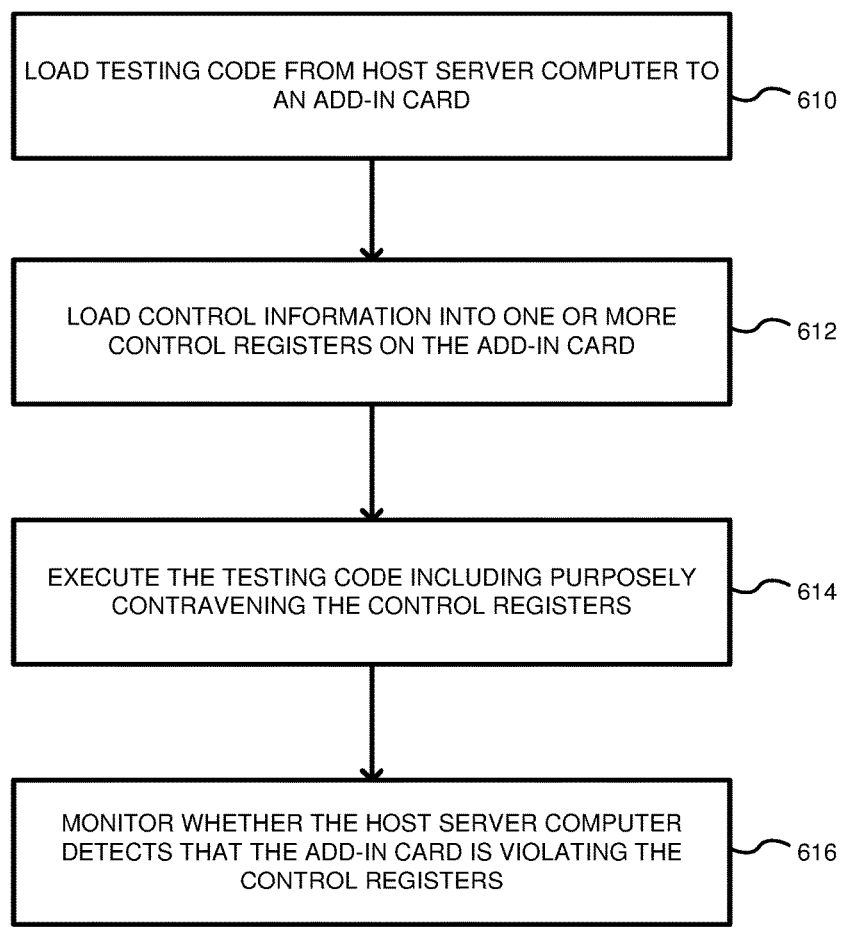
FIG. 6 is an example flowchart according to one embodiment for testing associated with a communication bus in a host server computer.

FIG. 6 is a flowchart according to one embodiment for generating security testing for an add-in card positioned within a host server computer. In process block 610, testing code from the host server computer is loaded to the add-in card. To determine which testing code is to be loaded, the host server computer can read configuration parameters from the add-in card to determine the card type (e.g., vendor, part number, etc.) and/or configuration space. Once the add-in card is identified, the host server computer can identify the appropriate device driver supporting the add-in card. The identified device driver can be loaded onto the add-in card as well as test code used for testing the communication bus supported by the device driver. The loading of the testing code is performed by transmitting the testing code from the host server computer (e.g., processor on the motherboard) to the add-in card. The loading of the test code can occur at any time, however, such loading typically occurs after updates of an operating system or of the BIOS of the host server computer. In process block 612, control information can be loaded into one or more control registers on the add-in card. For example, the host computer can load control information into a memory location of the add-in card. Such a loading can be considered a trigger event to initiate testing. Alternative triggers can be used such as adding a new command to the protocol passed between the host server computer and the add-in card. An example protocol for communication between the host server computer and the add-in card can be based on the PCIe standard. In process block 614, the testing code is executed that purposely contravenes settings of the control register. For example, the add-in card includes an embedded processor that executes the test code in response to the updating of a control register. The test code can include software for ignoring the control register setting and performing CPU instructions that violate the control register setting so as to check if the host server computer can detect such violations. In process block 616, monitoring is performed of how the host server computer handles the violations. Such monitoring can occur from an external host server computer (e.g., server 550 from FIG. 5) that extracts log data from the host server computer (e.g. 502A) upon which tests are being performed. The external host server computer can determine based on the log data that the updates to the operating system or the BIOS are operating correctly or incorrectly. If the updates pass the testing code, then the host server computer can seamlessly switch over to an operating mode from the test mode without inserting or removing any test hardware. Thus, by using a NIC or other add-in card with an embedded processor, testing can be performed using the NIC and then the NIC can be switched to its normal operating mode. The NIC therefore operates as a PCIe tester and a network interface.

Figure 7:
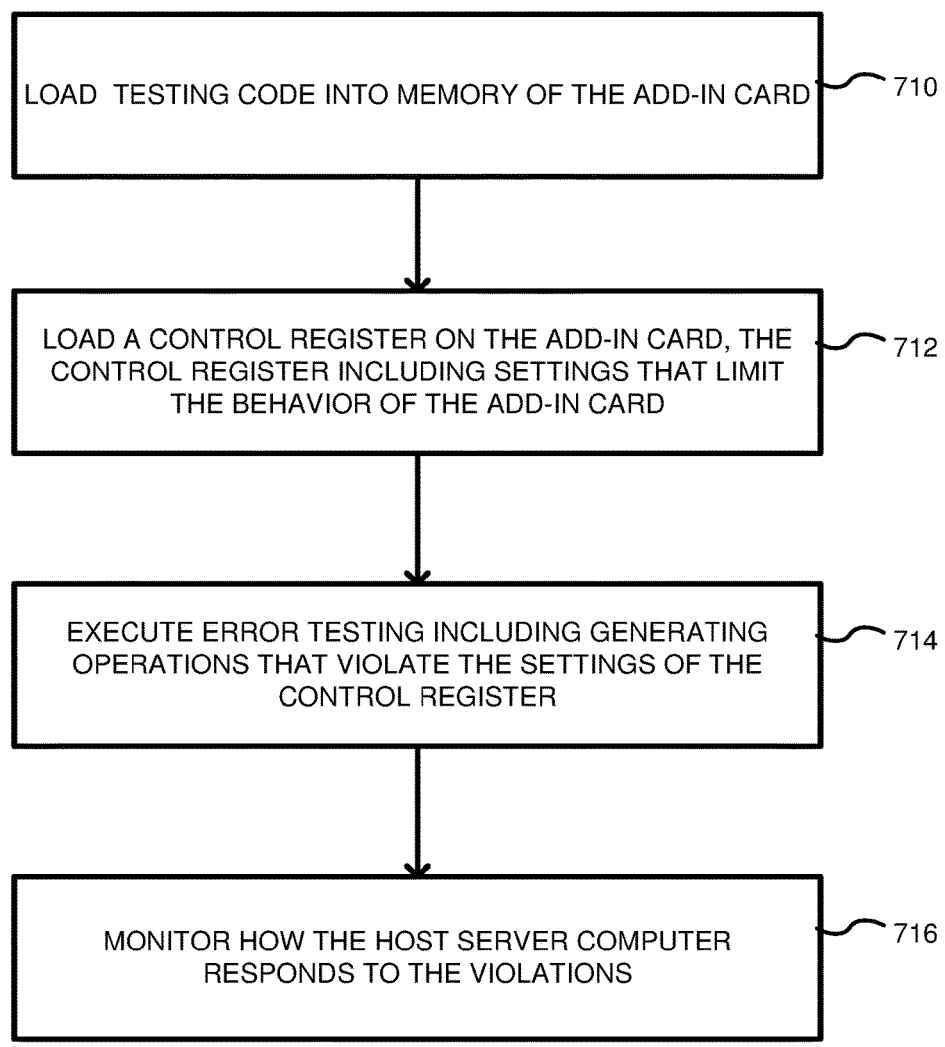
FIG. 7 is another example flowchart according to an embodiment for testing associated with a communication bus in a host server computer.

FIG. 7 is a flowchart of a method according to another embodiment for security testing. In process block 710, testing code can be loaded into the memory on the add-in card that was identified using the configuration parameters. The testing code can include a plurality of different tests which are individually selectable. A configuration space of an add-in card is detected, wherein the add-in card is coupled to a PCIe bus. The configuration space can be determined by reading from the host server computer configuration parameters associated with the add-in card. The configuration parameters can be used by the host server computer to perform a lookup in a table using the configuration parameters as keys. Once the configuration space is determined, the host server computer can decide which device driver to load on the add-in card and associated tests to be loaded. In process block 712, a control register is loaded on the add-in card that limits behavior of the add-in card. For example, the control register can dictate the functionality which the add-in card can implement. In process block 714, security testing can be executed including generating operations that violate settings of the control register. By triggering execution of the testing code, an agent on the add-in card can determine an initial address for the test which is to be executed and can jump to the test to begin execution. In process block 716, the host server computer can be monitored to determine how it responds and whether such a response indicates a violation of a control register setting, which can lead to software vulnerable to attack by hackers.

Figure 8:
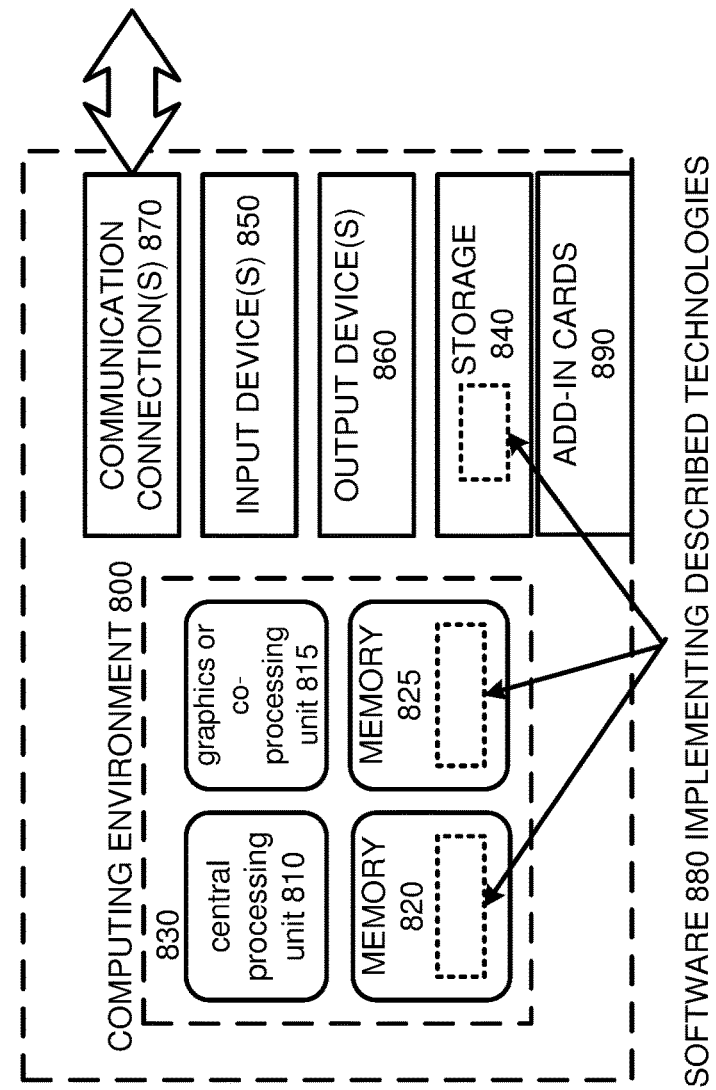
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870 (which can include a NIC). Add-in cards 890 can also be used to supplement functionality of the computing environment 800. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 9:
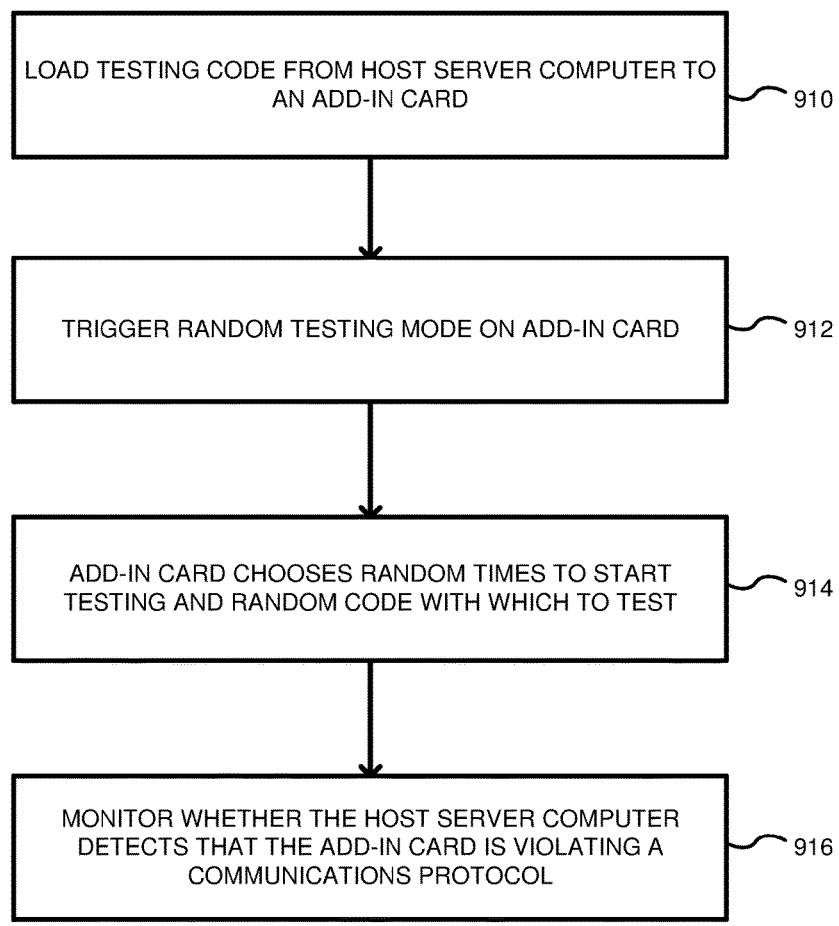
FIG. 9 is a flowchart according to another embodiment for performing security testing in a host server computer at random times.

FIG. 9 is a flowchart of a method according to another embodiment. In process block 910, testing code is loaded from the host server computer to an add-in card. Similar techniques for loading test code as described above can be used. In process block 912, random testing can be triggered on the add-in card. The trigger for such random testing can be generated from the host server computer, from a remote computer coupled to the host server computer through a network, or from the add-in card itself. In response to the trigger, the add-in card can use a random number generator or pseudo-random number generator for generating a time parameter used as a counter. The counter can increment or decrement until a threshold level is reached. In process block 914, the add-in card can start testing in response to the threshold level being reached and can then selectively choose which code to test. Test code selection can also be random. Thus, different test code and different start times can be used in order to initiate security testing on the host server computer so that violations of a communication protocol occur. In process block 916, a host server computer can monitor whether it detects that the add-in card is violating the communications protocol. Once the add-in card completes execution of the test code, it can reset the counter and perform further tests in a continuous loop.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of security testing for an add-in card on a host server computer, the method comprising:
   using the host server computer, the host server computer operating as a Peripheral Component Interconnect Express (PCIe) root complex, to load testing code into a memory of the add-in card, the add-in card including an embedded processor;
   from the host server computer, loading a control register on the add-in card, the control register indicating settings that limit behavior of the add-in card;

executing the testing code on the add-in card, the testing code reading the control register and generating operations that violate the settings of the control register; and monitoring how the host server computer responds to the generated violations.

2. The method of claim 1, wherein the loading of the testing code is performed by transmitting the testing code from the host server computer to the add-in card.

3. The method of claim 1, further including selecting the testing code based on reading configuration parameters of the add-in card.

4. The method of claim 1, wherein the loading of the control register is controlled by another host server computer in communication with the host server computer.

5. The method of claim 1, wherein the settings in the control register are associated with a power budget available to the add-in card and the testing code is associated with operating the add-in card such that the add-in card exceeds an available power budget.

6. The method of claim 1, wherein the control register includes one or more of the following associated with a PCIe protocol: a PCIe Capabilities Register, a Device Capabilities Register, a Device Control Register, a Device Status Register, a Link Capabilities Register, a Link Control Register, a Link Status Register, a Slot Capabilities Register, a Slot Control Register, a Slot Status Register, a Root Control Register, a Root Capabilities Register, or a Root Status Register.

7. A method, comprising:
loading testing code into an add-in card positioned within a slot on a host server computer and storing the testing code in memory on the add-in card;
triggering execution of the testing code;
executing the testing code including violating a communication protocol controlling communications between the host server computer and the add-in card; and
monitoring whether the host server computer detects that the add-in card is violating the communication protocol.

8. The method of claim 7, further including loading control information into a control register on the add-in card and wherein the violating of the communication protocol includes violating the control information in the control register.

9. The method of claim 8, wherein the control register includes one or more of the following associated with a PCIe protocol: a PCIe Capabilities Register, a Device Capabilities Register, a Device Control Register, a Device Status Register, a Link Capabilities Register, a Link Control Register, a Link Status Register, a Slot Capabilities Register, a Slot Control Register, a Slot Status Register, a Root Control Register, a Root Capabilities Register, or a Root Status Register.

10. The method of claim 7, wherein the triggering includes sending a triggering event from the host server computer to the add-in card, from another host server computer coupled to the host server computer to the add-in card, or from the add-in card to the add-in card itself.

11. The method of claim 7, wherein the add-in card uses a Peripheral Component Interconnect Express (PCIe) interface to communicate with the host server computer.

12. The method of claim 7, further including reading, using the host server computer, configuration parameters associated with the add-in card and wherein the loading of the testing code includes selecting which testing code to load based on the configuration parameters.

13. The method of claim 7, wherein the add-in card includes a Base Address Register (BAR) and the loading of the testing code includes using the BAR to load the testing code into the memory of the add-in card.

14. The method of claim 7, wherein the triggering includes initiating a random test mode wherein the add-in card chooses random times to execute tests that violate the communication protocol.

15. The method of claim 7, wherein the monitoring of the host server computer includes reading, from a another host server computer, log data stored on the host server computer to determine how the host server computer responded to the violation of the communication protocol.

16. The method of claim 7, wherein settings in a control register on the add-in card are associated with a power budget available to the add-in card and the testing code causes the add-in card to exceed an available power budget.

17. A system, comprising:
a host server computer including a motherboard, a communication bus, and a slot for receiving an add-in card;
an add-in card coupled into the slot, wherein the add-in card includes an embedded processor and a memory; and
testing code supplied from the host server computer and stored in the memory of the add-in card for execution by the embedded processor, wherein the embedded processor is configured to execute the testing code, and wherein the testing code includes tests that violate control register settings set in the add-in card by the host server computer, wherein the control register settings are associated with a communication protocol used for communicating over a communication bus coupled between the host server computer and the add-in card.

18. The system of claim 17, wherein the testing code tests whether the add-in card accesses memory that the add-in card is prohibited to access.

19. The system of claim 17, wherein the host server computer is a first host server computer and wherein the testing code is supplied to the add-in card in response to a request from a second host server computer.

20. The system of claim 17, wherein the host server computer is configured to read configuration parameters of the add-in card, which is a Network Interface Card (NIC), and select testing code associated with the configuration parameters.

* * * * *